(12) United States Patent
Tanaka et al.

(10) Patent No.: US 7,269,831 B2
(45) Date of Patent: Sep. 11, 2007

(54) MULTIPROCESSOR SYSTEM, MULTIPROCESSOR CONTROL METHOD, AND MULTIPROCESSOR CONTROL PROGRAM RETAINING COMPUTER-READABLE RECORDING MEDIUM

(75) Inventors: Ryuta Tanaka, Kawasaki (JP); Norichika Kumamoto, Kawasaki (JP); Toru Tsuruta, Kawasaki (JP); Ritsuko Tanaka, Kawasaki (JP); Nobuyuki Iwasaki, Fukuoka (JP); Teruo Ishihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 732 days.

(21) Appl. No.: 09/987,887

(22) Filed: Nov. 16, 2001

(65) Prior Publication Data

US 2002/0144086 A1 Oct. 3, 2002

(30) Foreign Application Priority Data

Mar. 29, 2001 (JP) ............................. 2001-097062

(51) Int. Cl.
*G06F 9/46* (2006.01)
*G06F 15/00* (2006.01)
(52) U.S. Cl. ........................................ 718/108; 712/34
(58) Field of Classification Search ........ 718/100–104, 718/108; 712/34
See application file for complete search history.

(56) References Cited

U.S. PATENT DOCUMENTS

| | | | | |
|---|---|---|---|---|
| 4,445,171 A | * | 4/1984 | Neches | 710/104 |
| 5,860,137 A | * | 1/1999 | Raz et al. | 711/202 |
| 6,061,711 A | * | 5/2000 | Song et al. | 718/108 |
| 6,223,274 B1 | * | 4/2001 | Catthoor et al. | 712/34 |
| 6,363,453 B1 | * | 3/2002 | Esposito et al. | 711/2 |
| 6,763,440 B1 | * | 7/2004 | Traversat et al. | 711/159 |
| 6,772,419 B1 | * | 8/2004 | Sekiguchi et al. | 719/319 |
| 7,024,671 B2 | * | 4/2006 | Yamashita | 718/102 |

* cited by examiner

*Primary Examiner*—Meng-Al T. An
*Assistant Examiner*—Camquy Truong
(74) *Attorney, Agent, or Firm*—Staas & Halsey LLP

(57) ABSTRACT

The present invention relates to a multiprocessor system, which comprises two or more processor elements to be executed by a common program, a control section for switching such plural processor elements one from another for execution by the common program, and a storing section storing handover information relating to the common program which information is to be handover from the one processor element to the another processor element. This not only optimizes each of the functions of the processor elements, but also achieves certain delivery or interchange of the information between these process or elements, and even reduces the power consumption.

27 Claims, 13 Drawing Sheets

| PE NUMBER | EXECUTION PERMISSION FLAG |
|---|---|
| 1 (PE2a) | 0 |
| 2 (PE2b) | 1 |
| ⋮ | ⋮ |
| N | 0 |

FIG. 4

| INTERRUPTION NUMBER | INTERRUPTION SUBJECT | VECTOR NUMBER | PRIORITY |
|---|---|---|---|
| 1 | ACTIVE | 1 | 1 |
| 2 | ACTIVE | 2 | N |
| ⋮ | ⋮ | ⋮ | ⋮ |
| N | ACTIVE | M | 2 |

33a

| INTERRUPTION NUMBER | INTERRUPTION SUBJECT | VECTOR NUMBER | PRIORITY |
|---|---|---|---|
| 1 | PE2a | 1 | 1 |
| 2 | PE2a | 1 | N |
| ⋮ | ⋮ | ⋮ | ⋮ |
| N | PE2a | M | 2 |

| INTERRUPTION NUMBER | INTERRUPTION SUBJECT | VECTOR NUMBER | PRIORITY |
|---|---|---|---|
| 1 | PE2b | 1 | 1 |
| 2 | PE2a | 1 | N |
| ⋮ | ⋮ | ⋮ | ⋮ |
| N | PE2a | M | 2 |

MULTIPROCESSOR SYSTEM, MULTIPROCESSOR CONTROL METHOD, AND MULTIPROCESSOR CONTROL PROGRAM RETAINING COMPUTER-READABLE RECORDING MEDIUM

BACKGROUND OF THE INVENTION (1) Field of the Invention

The present invention relates to a multiprocessor system having two or more processor elements, and more particularly to a multiprocessor system, a multiprocessor control method and a multiprocessor control program retaining computer-readable recording medium, for example, suitable for use in portable information communication terminal units such as portable telephone terminals, PHS (Personal Handyphone System) terminals.

(2) Description of the Related Art

In portable information communication terminal units such as portable telephone terminals and PHS (Personal Handyphone System) terminals, in addition to various control processing on an OS (Operating System), for example, there have been conducted the processing for compression/expanding of voice, image, moving image or the like and the processing for handling input/output signals. In general, an MPU (Micro Processing Unit) is suitable for various processing to be conducted on an OS, while a DSP (Digital Signal Processor) is suitable for the real-time processing such as the voice, image or moving image handling processing and the input/output signal handling processing.

In addition, there have been known DSP microcomputers and multiprocessor systems for conducting these different processing in the information processing apparatus.

The DSP microcomputer comprises a processor architecture setting up the integration of an MPU function capable of conducting the OS processing efficiently and a DSP function capable of conducting signal processing or the like at a high speed. The proper use between the MPU function and the DSP function integrated with each other in this DSP microcomputer is feasible in a manner that MPU instructions and DSP instructions are described in one program in a state mixed according to applications.

Moreover, in this programming, the use of an MPU instruction compatible with an existing MPU can relatively facilitate the porting of an existing OS onto the DSP microcomputer, and the use of a DSP instruction interchangeable with an existing DSP enables the utilization of the existing DSP signal processing software properties, while the DSP instruction can be described as a task under OS management.

Still moreover, in the design of the architecture of the DSP microcomputer, if the pipeline structure is made to meet the characteristic of any one of the MPU function and the DSP function, then this realizes fast processing.

For example, the speed-up of the processing is feasible by structuring a multistage pipeline to the characteristic of the MPU function while decreasing the branch overhead according to various control conditions. In addition, the speed-up of the processing is feasible through the compression in the time-axis direction in a manner that, to the characteristic of the DSP function, the load/store overhead of the memory is reduced and a plurality of sum-of-products operations are conducted in the form of pipeline. Still additionally, the speed-up of the processing is also possible in a manner that loop processing is conducted at a high speed by means of the space-direction expansion using the parallel processing.

The multiprocessor system is equipped with a plurality of processor elements, for example, an MPU and a DSP so that the MPU conducts the processing on the OS while the DSP controls the signal processing. Moreover, a conventional multiprocessor system has an existing MPU and an existing DSP, which can facilitate the construction of a system and can utilize the existing software properties effectively.

There is a problem, however, in that, because the DSP microcomputer has the integration of the DSP function into the MPU pipeline structure as mentioned above, a pipeline structure optimal to the DSP is not always made in the DSP microcomputer, which can lower the DSP performance. That is, in the DSP microcomputer, difficulty is experienced in designing both the MPU and DSP to 100% exhibit their performances.

In addition, for the development of an LSI for the DSP microcomputer, there is a need to develop a new architecture for the DSP microcomputer, and this development requires an extremely long time and an extremely high cost.

In particular, since the DSP microcomputer has the integration of the MPU and the DSP which are processor pipelines originally different in architecture from each other, difficulty is experienced in developing/designing an architecture optimal to each processing according to the cycles of the market requirements for a short time, and in optimizing the performance of the MPU or the DSP. Moreover, in fact, it is difficult to design it while maintaining the compatibility between the DSP microcomputer and the existing MPU or DSP, which makes it difficult to divert the software properties for the existing MPU or DSP.

Meanwhile, in the conventional multiprocessor system, difficulty is encountered in programming while providing excellent convenience in a state where an MPU instruction and a DSP instruction, which are different in function from each other, are mixed with effect. Moreover, in the conventional multiprocessor system, since each of processor elements is made to operate independently, difficulty is experienced in seizing a flow of the processing of a program implemented in each processor element, thus making difficult the programming and debug.

Furthermore, in the conventional multiprocessor system, for the interchange of data between the MPU and the DSP, there is a need to conduct the exclusive control processing, the synchronous processing or the like, and this imposes a burden on the software developments considering these processing, and the overhead in the exclusive control processing or the synchronous processing lowers the performance.

Still furthermore, although information processing terminals such as portable telephones are required to reduce the power consumption, the conventional multiprocessor system encounters the difficulty of the reduction of the power consumption because the respective processor elements operate simultaneously.

In addition, in the conventional multiprocessor system, although the MPU and the DSP share data by means of the loose coupling, the MPU and the DSP are strictly made to operate independently of each other, which makes it difficult to place an MPU instruction and a DSP instruction in a state mixed in one program.

Meanwhile, if the processing contents of one program described in a high-level language such as the C language can be decided through the use of a tool such as the compiler and the processing can be divided into specific processing units (function units, thread units, or the like) so that the divided processing are allocated to the optimum processors according to the processing contents to conduct the distributed processing on the multiprocessor in a state synchronized, this signifies that a programmer can describe a program, apparently one in number, which enables the proper use of the processing according to an MPU instruction and the processing according to a DSP instruction with efficiency.

However, in fact, it is very difficult from the technical point of view for a programming tool to automatically make a decision on which of processors is optimum to each processing unit, and such a tool capable of optimizing it in full automation has not come into widespread use yet. Moreover, in the case of the interrupt control which has been realized with the conventional multiprocessor system, even if a centralized control type interrupt controller is put to use, it cannot realize that the programs described in the form unified work as a flow of one program in a state synchronized among a plurality of processors. This is because the flow of one program destroys, for example, when an interruption occurs after the program processing straddles a plurality of processors

SUMMARY OF THE INVENTION

The present invention has been developed in consideration of such problems, and it is therefore an object of the invention to provide a multiprocessor system, a multiprocessor control method and a multiprocessor control program retaining computer-readable recording medium, which are capable of not only optimizing each of functions of two or more processor elements, but also securely accomplishing the interchange of information between these processor elements, and more even reducing the power consumption.

For this purpose, a multiprocessor system according to the present invention is characterized by comprising two or more processor elements whose performances are to be executed by a common program, a control section for switching such plural processor elements one from another for execution by the common program; and a storing section, responsive to each switching of the processor elements by the control section for storing handover information relating to the common program which information is to be handed over from the one processor element to the another processor element.

In addition, a multiprocessor control method according to the present invention, which switches two or more processor elements of a multiprocessor system whose performances are to be executed by a common program, is characterized by comprising (a) a storing step of, in response to each switching of said processor elements, storing handover information relating to the common program, which information is to be handed over from said one processor element to said another processor element, into a storing section of said multiprocessor system, and (b) after said handover information has been stored into the storing section, stopping the performance of said one processor element and starting said another processor element using said handover information stored in the storing section.

Still additionally, a computer-readable recording medium according to the present invention retains a multiprocessor control program for making a computer implement step(a) and step(b).

Accordingly, the processor elements using the handover information relating to the common program, which is to be handed over from the one processor element to the another processor element.

It is also appropriate that, with the switching of the processor elements, the control section stores the handover information from the one processor element into the storing section and then stops the performance of the one processor element and, at the same time, starts the performance of the another processor element using the handover information stored in the storing section.

The multiprocessor system, multiprocessor control method and multiprocessor control program retaining computer-readable recording medium according to the present invention provide the following effects and advantages.

(1) With the switching of the processor elements, the handover information to be handed over from the one processor element to the another processor element is stored from the one processor element into the storing section and, after the storage of this handover information, the one processor element is stopped while the another processor element is started using the handover information stored in the storing section; therefore, it is possible to easily and securely deliver the information to the another processor element, which enables easy and certain switching of the processor elements.

(2) Stopping the another processor element reduces the power consumption in the system and further permits the program to be described in succession, thus facilitating the programming and maintenance.

(3) In a case in which an operation for which a request takes place to a processor element is to be conducted by other than this processor element, the switching between processor elements is easily and securely achievable by the output of a processor element switching request signal.

(4) When a switching control interruption signal is used as the switching request signal, it is possible to unitarily control the switching request signal and another interruption signal.

(5) The processor element is surely controllable in a manner that, upon receipt of a signal from the external, a processor element interruption signal is outputted to the processor element.

(6) The switching control of the processor element becomes easy in a manner that there is a table for indicating, for designation of one at a time from said plural processor elements, a permitted-to-perform processor element, which is allowed to perform processing, and controls the switching of said elements so as to designate said permitted-to-perform processor element based on said table.

(7) When one of plural processor elements is actuated with precedence over the remaining processor elements, and one of the remaining processor element is actuated in place of the second-to-last-named one processor element as demand arises, the preferentially actuated processor element can seize the operation of the other processor element, thus facilitating the maintenance such as debug, or programming, which leads to further convenience.

(8) In a case in which plural processor elements have functions different from each other, each of the processor elements can be made to conduct suitable processing, which contributes to improvement of the processing efficiency.

(9) In particular, in a case in which an MPU and a DSP are included as the two or more processor elements, the MPU can conduct the processing on the OS while the DSP can conduct the real-time based processing, such as the processing of voice, image or moving image, or input/output processing.

(10) If, upon receipt of a signal from the external, one processor element for handling this signal is selected from two or more processor elements and started, the optimum processor element can conduct the processing, thus improving the processing efficiency.

(11) If an invalidating section is provided to invalidate the switching function for starting plural processor elements simultaneously, it is possible to actuate all the processor elements simultaneously. For example, even in the case of the processing requiring a high processing performance, the fast processing becomes feasible, and it is possible to flexibly use the multiprocessor system according to the present invention.

BRIEF DESCRIPTION OF THE DRAWINGS

FIG. 4 is an illustration of an interruption control table in the multiprocessor system according to the first embodiment of the present invention;

DESCRIPTION OF THE PREFERRED EMBODIMENTS

Embodiments of the present invention will be described hereinbelow with reference to the drawings.

(A) Description of First Embodiment

Figure 1:
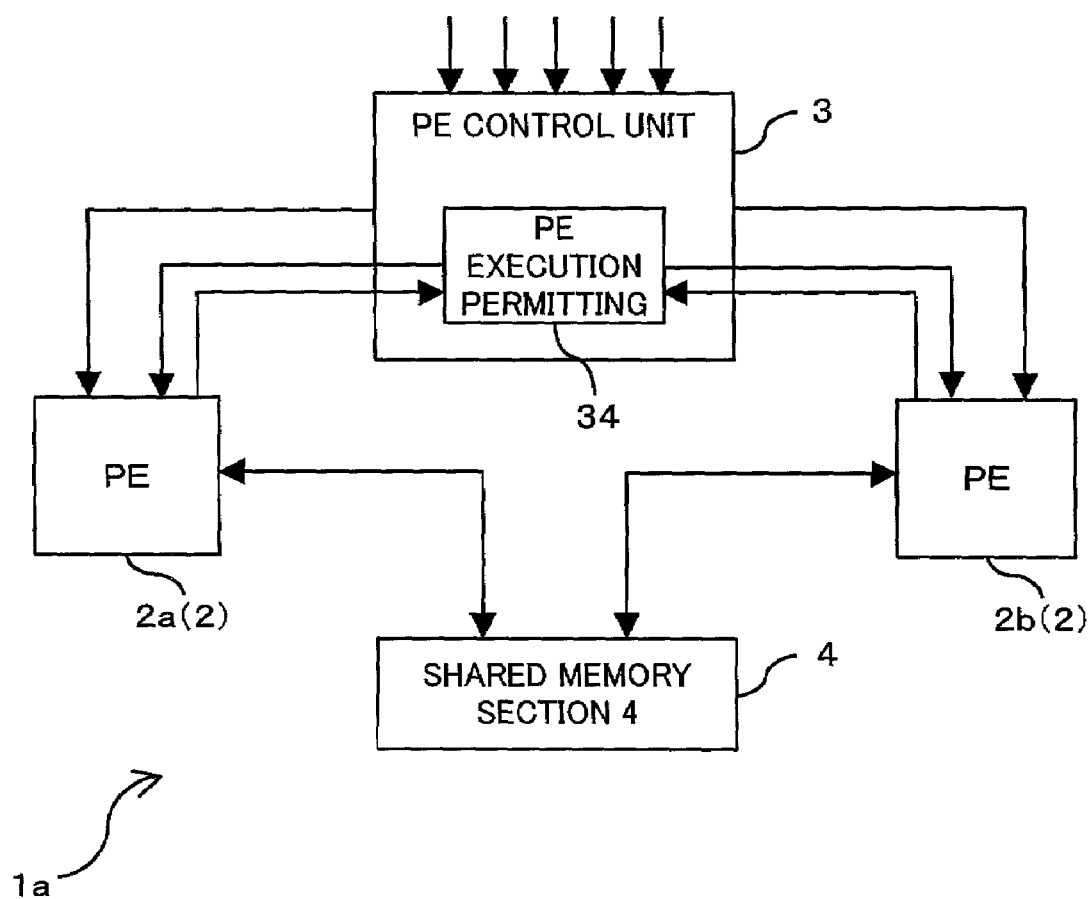
FIG. 1 is a block diagram showing a functional configuration of a multiprocessor system according to a first embodiment of the present invention.
Figure 2:
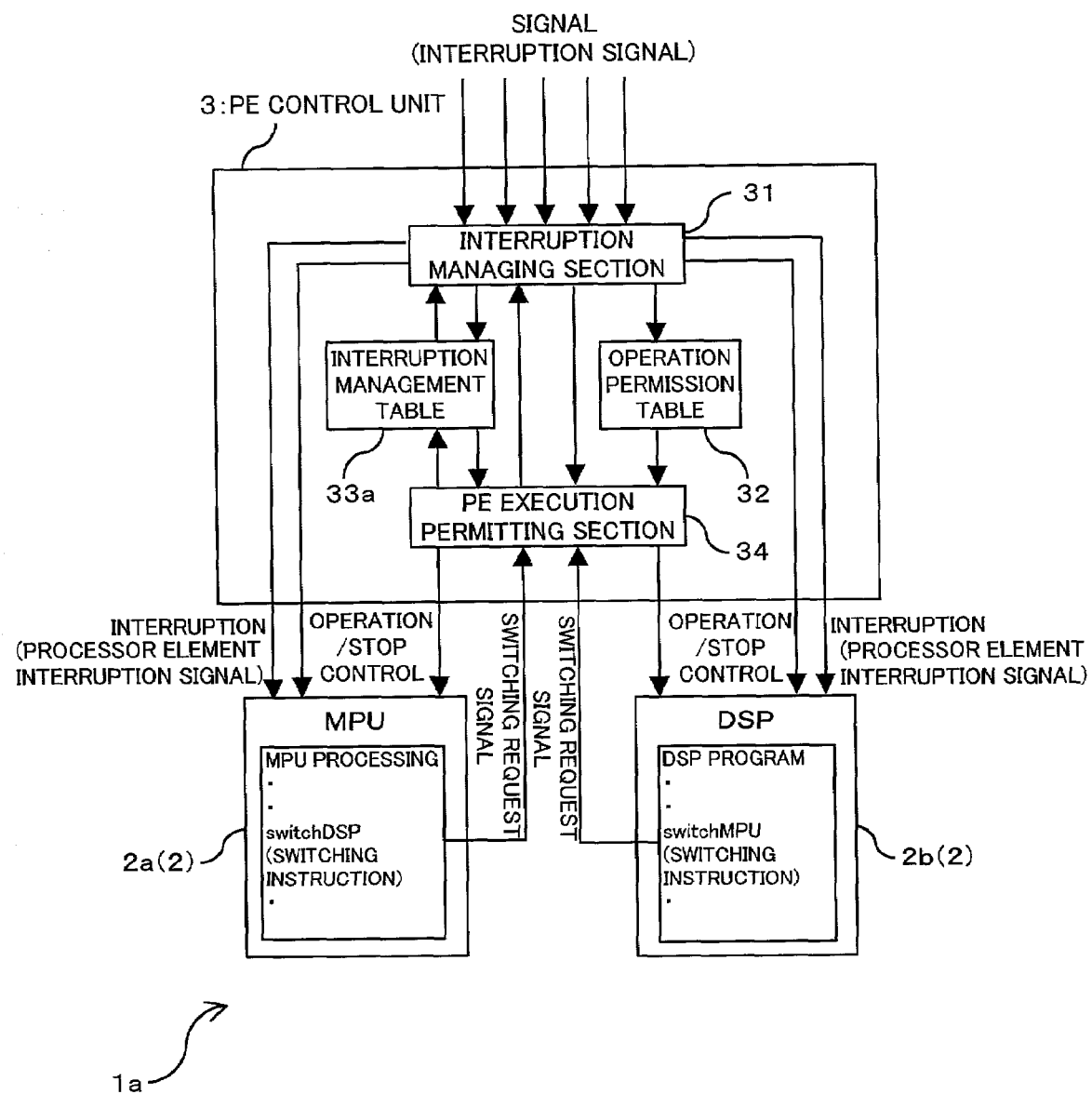
FIG. 2 is a block diagram useful for explaining a functional configuration and signal flow of the multiprocessor system according to the first embodiment of the present invention.

FIGS. 1 and 2 are for explaining a configuration of a multiprocessor system 1*a* according to a first embodiment of the present invention. FIG. 1 is a block diagram showing a functional configuration thereof, and FIG. 2 is a block diagram showing a functional configuration and signal flow in the multiprocessor system 1*a* according to the first embodiment.

The multiprocessor 1*a* according to the first embodiment is made to conduct various control/processing in a portable information processing apparatus such as a portable telephone terminal or a PHS (Personal Handyphone System) terminal, and as shown in FIG. 1, is made up of Processor elements (which will be referred to hereinafter as "PEs") 2*a* and 2*b*, a PE control unit (control section) 3 and a shared memory section (storing section) 4.

Each of the PE 2*a* and the PE 2*b* is a processor element (selected processor element) which conducts various processing in an information processing apparatus. These PE 2*a* and PE 2*b* have functions different from each other, and in this embodiment, as the PE 2*a*, for example, provided is an MPU (Micro Processing Unit) suitable for various control processing on an OS (Operating System), and as the PE 2*b*, for example, provided is a DSP (Digital Signal Processor) suitable for real-time processing such as voice processing, image processing and input/output processing.

These PE 2*a* and PE 2*b* are to be performed by executing a common program.

These PE 2*a* and PE 2*b* employ an existing architecture and execute stop control in response to a processor stop signal (an interruption signal for a processor element) from the PE control unit 3, while they are made to output a switching request signal to the PE control unit 3.

The switching request signal from the PE 2*a* or the PE 2*b* to the PE control unit 3 is realizable through the use of a design which outputs it when a switching request instruction is issued, and the development of a processor element having these functions is easily feasible by diverting an existing IP (Intellectual Property) core. In addition, this first embodiment relates to an example in which a task management or the like by the OS is not made particularly, and the PE 2*a* and the PE 2*b* are respectively equipped with interruption handlers having equivalent functions, thereby conducting the interruption processing.

Moreover, in a case in which the processing for which a request takes place to the PE 2*a* is to be conducted by a processor element other than the PE 2*a*, that is, if that processing should be conducted by the PE 2*b*, the PE 2*a* is made to output a processor element switching request signal to the PE control unit 3.

Similarly, in a case in which the processing for which a request takes place to the PE 2*b* is to be conducted a processor element other than the PE 2*b*, that is, if that processing should be conducted by the PE 2*a*, the PE 2*b* is designed to output a processor element switching request signal to the PE control unit 3.

In this connection, as marks representative of processor elements, a mark 2*a* or 2*b* is used when there is a need to specify one of a plurality of processor elements, and that processor element is represented as PE 2*a* or PE 2*b*, while a mark 2 is used for an indication of an arbitrary processor element, and that processor element is designated as processor element 2.

The PE control unit 3 is for switching one processor element 2 of the PE 2a and the PE 2b from another for execution by the common program, as a selected processor element 2 to actuate it, and is for, at the switching of this selected processor element 2, makes a shared memory section 4, which will be mentioned later, store information (which will be referred to hereinafter as "handover information") to be handed over from the selected processor element 2 before switched to the selected processor element 2 after switched, with this information being fed from the selected processor element 2 before switched. After the storage of this handover information, the PE control unit 3 stops or deactivates the selected processor element 2 before switched and actuates the selected processor element 2 after switched through the use of the handover information stored in the shared memory section 4.

Incidentally, as the aforesaid handover information, for example, a program counter, an argument of a function, a return value of a function, a stack pointer or the like is delivered from the selected processor element 2 before switched to the selected processor element 2 after switched.

In addition, as FIG. 1 shows, the PE control unit 3 is made to receive a signal (interruption signal) from the exterior of the PE control unit 3, such as a signal from an input unit of an information processing apparatus, for outputting a processor element interruption signal to the PE 2a or the PE 2b in accordance with this interruption signal.

As FIG. 2 shows, the PE control unit 3 is composed of an interruption managing section 31, an interruption management table 33a, an operation permission table (table) 32 and a PE execution permitting section 34. Incidentally, in FIG. 1, the interruption managing section 31, the operation permission table 32 and the interruption management table 33a are omitted from the illustration. Moreover, in FIG. 2, the shared memory section is omitted from the illustration.

Figure 3:
FIG. 3 is an illustration of an example of an operation permission table in the multiprocessor system according to the first embodiment of the present invention.

FIG. 3 is an illustration of an example of the operation permission table 32, and FIG. 4 is an illustration of an example of the interruption management table 33a. As FIG. 3 shows, the operation permission table 32 retains PE numbers serving as information for identifying the PE 2a or the PE 2b and execution permission flags serving as information for identifying execution permission states of the processor elements 2, which associated with each other, and the PE execution permitting section 34 is made to set the execution permission flags of this interruption management table 33a.

In the operation permission table 32 shown in FIG. 3, the PE number "1" represents the PE 2a and the PE number "2" designates the PE 2b.

In addition, in the operation permission table 32, "0"or "1" is set as the execution permission flag, and in particular, "1" is set for only any one of two or more processor elements 2, while "0" is set for other than this processor element 2. That is, the interruption managing section 31 always sets the execution permission flag "1" on only one of the PE 2a and the PE 2b and sets "0" on the others. The processor element (execution permitted processor element) 2 for which the execution permission flag is set at "1" is allowed to implement the processing, while the processor element 2 for which the execution permission flag is set at "0" is in an operation non-permitted condition and in a stopped or deactivated condition (waiting condition in a less power consumption mode of the processor, or the like).

The processor element 2 for which the execution permission flag "1" is set in the operation permission table 32 corresponds to a selected processor element 2.

As FIG. 4 shows, the interruption management table 33a is for managing "interruption number", "interruption subject", "vector number" and "priority" in a state associated with each other. The "interruption number" is a number for specifying an interruption inputted to the PE control unit 3, and the "interruption subject" is information for specifying a processor element 2 (PE 2a, PE 2b) which is to conduct the processing requested on the basis of the "interruption number". In this first embodiment, all the "interruption subjects" are set as "active". This signifies that a processor element interruption signal is inputted to the processor elements 2 for which the execution permission flag "1" set in the above-mentioned operation permission table 32.

The "vector number" is indicative of an interruption number of a processor element interruption signal to be inputted to the PE 2a or the PE 2b, and the "priority" is representative of the priority of each interruption processing specified by the "interruption number". The interruption managing section 31 is made to forms this interruption management table 33a on the basis of signals inputted to the PE control unit 3.

The PE execution permitting section 34 is for controlling the operation/stop of each of the processor elements 2 by setting the execution permission flag in the operation permission table 32 as mentioned above. In addition, the PE execution permitting section 34 is made to receive a switching request signal from the PE 2a and the PE 2b for setting the execution permission flag in the operation permission table 32 on the basis of this switching request signal, thus controlling the operation/stop of each processor element 2.

Concretely, the PE execution permitting section 34 sets, in accordance with the switching request signal from the PE 2a or the PE 2b, the execution permission flag to "0" in the operation permitting table 32 with respect to the processor element 2 which has made the switching request so that it falls into an inhibited condition, and sets the execution permission flag to "1" in the operation permission table 32 with respect to the processor element 2 to which the switching is made so that it is placed into a permitted condition. Thus, the processor element 2 which has make the switching request takes a waiting (stopping) state while the processor element 2 to which the switching is made shifts from the stopping state to the active state.

The interruption managing section 31 is made to set up the interruption management table 33a on the basis of interruption signals from the external as mentioned above for controlling the interruption to each processor element 2 (PE 2a, PE 2b), and is made to output a processor element interruption signal to the selected processor element 2 for which the operation permission flag "1" is set in the operation permission table 32.

That is, the PE control unit 3 is designed to control the switching between the PE 2a and the PE 2b on the basis of the operation permission table 32 and the interruption management table 33a, and at this time, only one processor element 2 (active PE) is placed into operation while the other processor element 2 is placed into a processing stopping condition.

In the first embodiment, the switching of the processor element 2 is made in response to a switching request signal from the PE 2a or the PE 2b. This switching request can be made in a manner that a dedicated instruction is additionally provided in each processor element 2, or by the issuing of an interruption/return instruction. In either case, upon the issuing of these instructions, a switching request signal is inputted to the PE execution permitting section 34 of the PE control unit 3.

Furthermore, in this embodiment, a CPU of the information processing apparatus functions as the PE control unit 3 (interruption managing section 31, operation permission table 32, interruption management table 33a and PE execution permitting section 34) by executing a program (multiprocessor control program; common program) stored in a computer-readable recording medium (for example, memory, magnetic storage, floppy disc, memory card, magneto optical storage, CD-ROM, CD-R, CD-RW, DVD, DVD-R, DVD-RW, or the like).

A method of realizing the function as the PE control unit 3 is not limited to that the CPU executes the program as mentioned above, but it is also appropriate that a hardware is provided which has a function as the PE control unit 3.

The shared memory 4 is for storing the aforesaid handover information when the PE control unit 3 switches the selected processor element 2. In this shared memory 4, the handover information is written by the PE 2a and the PE 2b, and this written handover information is read out by the PE 2a and the PE 2b. In other words, the PE 2a and the PE 2b hand over the handover information to each other through the shared memory section 4. Incidentally, for example, this shared memory 4 is constructed with a RAM (Random Access memory) or the like.

Figure 5:
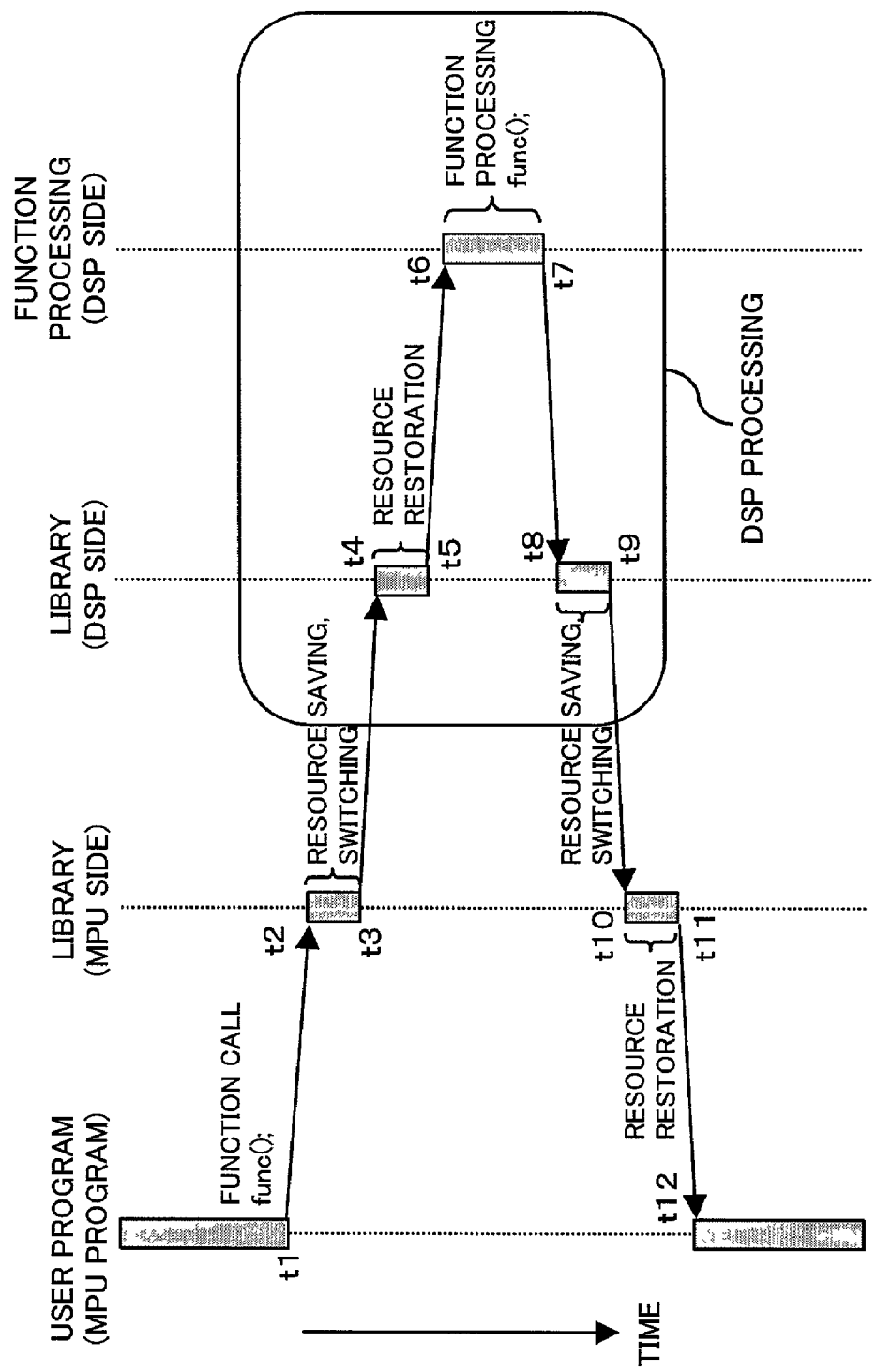
FIG. 5 is a sequence illustration of an ordinary procedure other than interruption processing in the multiprocessor system according to the first embodiment of the present invention.
Figure 6:
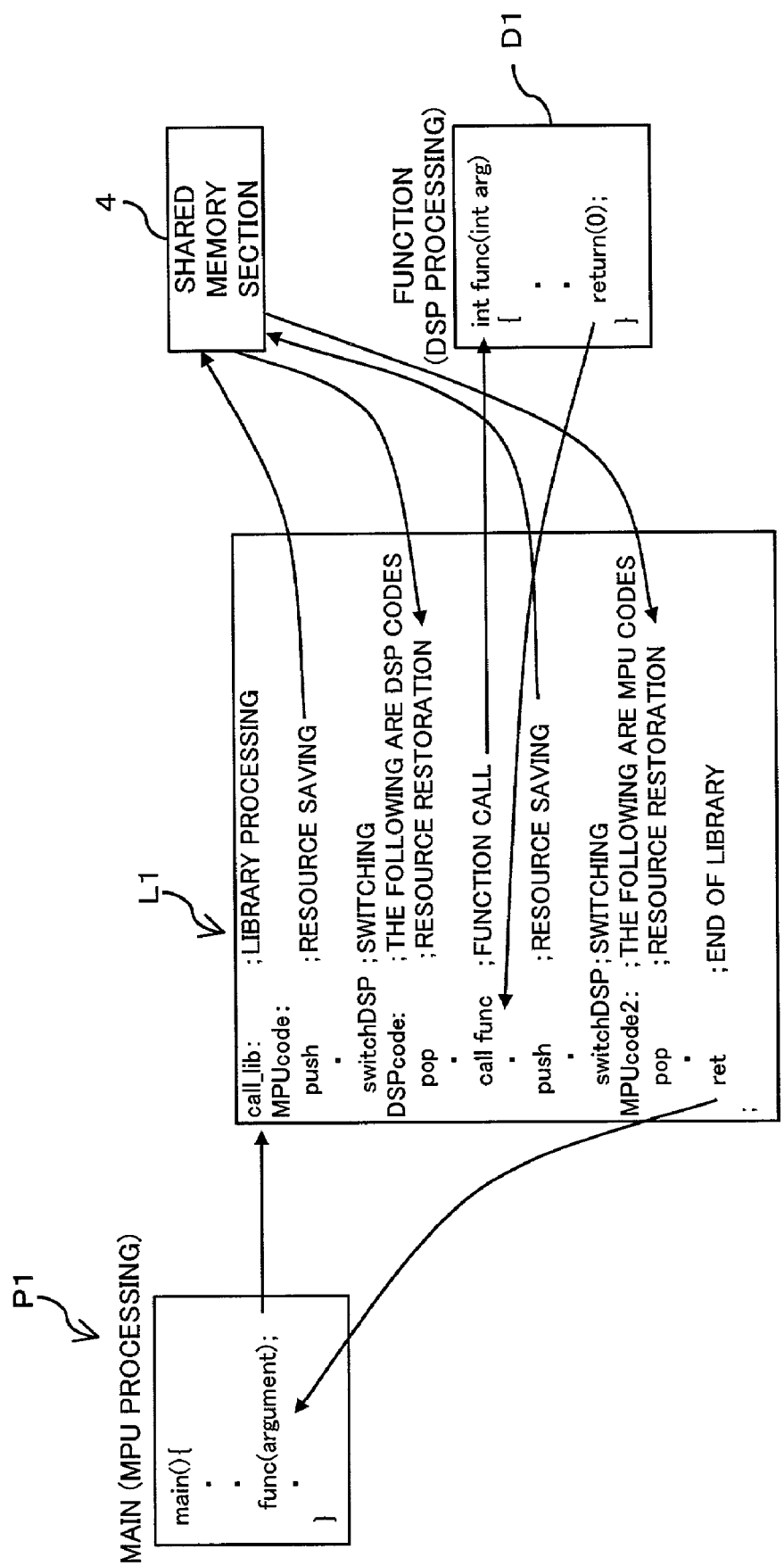
FIG. 6 is an illustration useful for explaining a library operation in the multiprocessor system according to the first embodiment of the present invention.

Referring to FIG. 6 and a sequence illustration of FIG. 5, a description will be given hereinbelow of an ordinary procedure other than the interruption processing in the multiprocessor system 1a thus constructed according to the first embodiment of the present invention.

FIG. 6 is an illustration useful for explaining a library operation in the multiprocessor system 1a according to the first embodiment.

A main program P1 (see FIG. 6), which works on the OS, is executed by the PE 2a, and when a request (function call) for the processing of a function D1 (DSP processing; see FIG. 6) is made from the main program P1 to the PE 2b (see t1 in FIG. 5), a library L1 is executed to store (resource saving) the handover information from the PE 2a in the shared memory section 4 and further to make the switching from the PE 2a to the PE 2b (see t2 to t3 in FIG. 5).

Following this, in the library L1, after the PE 2b reads out the handover information from the shared memory section 4 (resource restoration); see t4 to t5 in FIG. 5), a function call is made in the library L1 so that The PE 2b implements the function D1 (see t6 to t7 in FIG. 5).

On the completion of the processing of the function D1 by the PE 2b, in the library L1, the handover information such as a return value or the like from the PE 2b is put in the shared memory section 4 (resource saving), and the switching is made from the PE 2b to the PE 2a (see t8 to t9 in FIG. 5), and thereafter, the PE 2a reads out the handover information from the shared memory section 4 to make the resource restoration (see t10 to t11 in FIG. 5). At this time, the processing by the library L1 comes to an end, and the processing of the main program P1 by the PE 2a continues (see t12 in FIG. 5).

Thus, in this first embodiment, the operation is shifted from the main program P1 through the library L1 to the function processing (DSP processing) by the PE 2b by means of the function call, and at the completion of this DSP processing, the operation is returned from the function processing to the main program P1 to resume the MPU processing, so the switching is made from the processing by the PE 2a to the processing by the PE 2b on the program which is apparently one in number. In addition, at this time, while the PE 2b conducts the processing, the PE 2a is placed into the deactivated condition, and while the PE 2a conducts the processing, the PE 2b is in the deactivated condition.

Furthermore, at the programming, if a compiler direction such as #pragma makes the compiler make a decision that the function for the DSP processing is a DSP processing function, the function for the DSP processing is compiled as a DSP instruction.

Still furthermore, the compiler makes code generation at a lower layer of the program to pass it through an interprocessor calling library (library L1) for the purpose of the calling of the DSP function or the returning from the function. As FIG. 6 shows, the library L1 includes a processor switching instruction (for example, switch DSP, switch MPU), and performs the delivery of an argument to the function or the delivery of a return value thereto through the use of the shared memory section 4.

Thus, in creating a program (multiprocessor control program) for realizing the multiprocessor system 1a according to the first embodiment of the present invention, the programmer can use the MPU and the DSP with high efficiency by simply giving a direction on a signal processing routine or the like, the DSP is to execute through the use of a DSP instruction, to the compiler partially in a series of programs.

Figure 7:
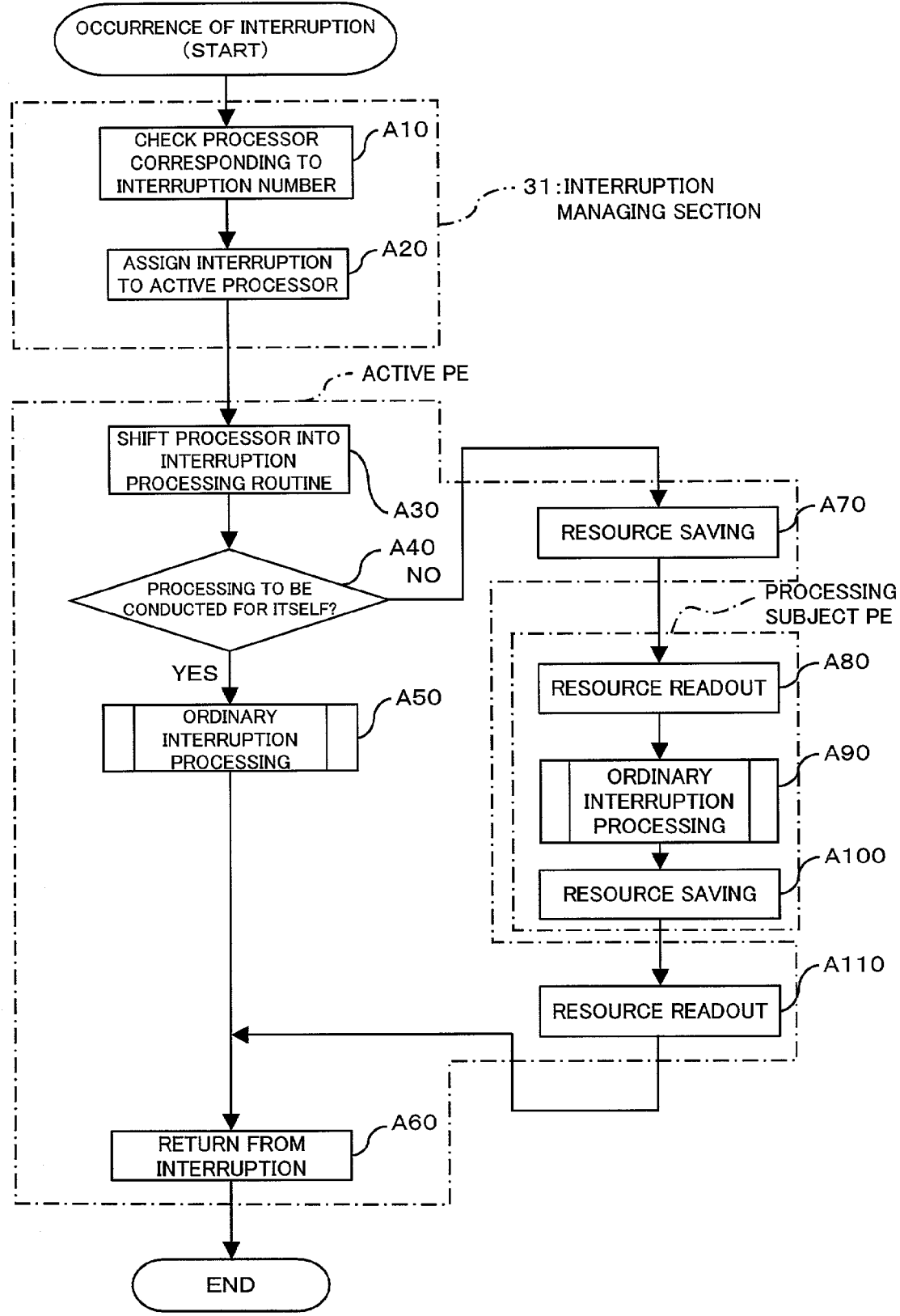
FIG. 7 is a flow chart useful for explaining a control method to be executed for when an interruption occurs, in the multiprocessor system according to the first embodiment of the present invention.

Secondly, referring to a flow chart (steps A10 to A110) of FIG. 7, a description will be given of a control method to be conducted for when an interruption occurs in the multiprocessor system according to this first embodiment.

For example, when an interruption occurs while the processor element 2 forming one of the PE 2a and the PE 2b is in the processing state, the interruption managing section 31 sees the interruption management table 33a to specify the processor element corresponding to that interruption processing (step A10) and further sees the operation permission table 32 to input a processor element interruption signal to the processor element (selected processor element) 2 which is in the "active" state (step A20), thus shifting this processor element 2 (which sometimes will be referred to hereinafter as an "active PE") into an interruption processing routine (step A30). The processing of these steps A10 and A20 are conducted by the interruption managing section 31.

Upon receipt of the processor element interruption signal, the active PE makes a decision, through the use of its interruption handler, as to the processor element 2 which is to conduct the processing on that interruption request to check whether or not to conduct the processing for itself (step A40). If the decision shows that the processing is to be conducted for itself (see YES route from step A40), the active PE conducts the ordinary interruption processing (step A50).

This ordinary interruption processing is realized by implementing, according to its priority, the requested interruption processing after the information (a program counter, a stack pointer, an argument of a function, an operation result, or the like) necessary for the processing being conducted is temporarily stored in a storing section (not shown).

The storing section to be used for this ordinary interruption processing is constructed with a RAM or the like. Incidentally, it is also possible to use a portion of the shared memory section 4 as this storing section.

In addition, the active PE again acquires the information temporarily stored in the storing section in the step A50 after this ordinary interruption processing, and returns to the state before the interruption processing (step A60), and thereafter, the processing comes to an end.

On the other hand, if the active PE has made a decision, through its interruption handler, that the requested processing is not to be conducted for itself (see NO route from the step A40), the handover information is put in the shared memory section 4 to perform the resource saving (step A70). Moreover, at this time, the active PE outputs a switching request signal to the PE execution permitting section 34.

The PE execution permitting section 34 sets an execution permission flag in the operation permission table 32 on the basis of the switching request signal inputted from the active PE and stops the operation of the active PE, and further permits the operation of the processor element 2 (which sometimes will be referred to hereinafter as a "processing subject PE") which is to conduct the requested processing.

The processing subject PE performs the setting for task switching, and acquires (resource return processing) the handover information from the shared memory section 4 (step A80), and further makes the switching of the task at the return from the interruption processing routine. As a part of this task switching processing, the switching to the processing subject takes place.

Following this, the processing subject PE conducts the ordinary interruption processing (step A90). This ordinary interruption processing is similar to the processing conducted by the active PE in the step A50. When the processing subject PE performs the switching to the active PE at the completion of the task processing, the active PE side performs the switching to the next task to continue the processing. Incidentally, this procedure depends on the execution method such as a task managing manner of the OS.

In addition, at this time, the processing subject PE outputs a switching request signal to the PE execution permission section 34. The PE execution permission section 34 sets the execution permission flag in the operation permission table 32 on the basis of the switching request signal inputted from the processing subject PE, and stops the operation of the processing subject PE while permitting the operation of the active PE. Still additionally, for saving, the processing subject PE puts the handover information in the shared memory section 4 (step A100).

The active PE acquires the handover information from the shared memory section 4 (step A110), and then the processing comes to an end after passing through the step A60.

As described above, with the multiprocessor system 1a according to the first embodiment of the present invention, one of two or more processor elements 2 such as MPU, DSP and others (in this embodiment, two processor elements of PE 2a and PE 2b) different in function from each other is selected as a selected processor element 2 and actuated, and the processing by the PE 2a and the processing by the PE 2b are placed in one continuous program in a state mixed, thus conducting the processing efficiently.

Moreover, since the processor element 2 after switched is deactivated by the PE operation permitting section 34, only one processor element 2 (active PE) operates while the other processor elements 2 take a processing stopping condition, which reduces the power consumption, and since the program can be described in succession, the programming becomes easier and the maintenance becomes simpler.

Still moreover, the switching from the active PE to the processing subject PE can be made by the issuing of an instruction (switching request instruction) from a program, and the description can be given as one continuous program.

In addition, at the switching of the selected processor element, the handover information from the selected processor element 2 before switched is stored in the shared memory section 4 and, after the storage of this handover information, the selected processor element 2 before switched is deactivated and the selected processor element 2 after switched is actuated through the use of the handover information stored in the shared memory section 4; therefore, it is possible to easily and securely hand over the handover information to the selected processor element 2 after switched, which leads to easy and certain switching of the selected processor element 2.

Still additionally, in a case in which the processing for which a request takes place to a processor element 2 by means of interruption is to be conducted by other than this processor element 2, a processor element 2 switching request signal is outputted to the PE control unit 3 (PE execution permitting section 34), thereby accomplishing the switching of the processor element 2 easily and securely. Yet additionally, at this time, the processor element 2 before switched can seize the occurrence of the switching.

Furthermore, since the PE control unit 3 has the operation permission table 32 and the interruption management table 33a and controls the switching of the selected processor element 2 on the basis of the operation permission table 32 and the interruption management table 33a, the processing by the PE 2a and the processing by the PE 2b are placed in one program in a state mixed, and the switching of the selected processor element 2 is easily controllable.

Still furthermore, the PE control unit 3 (interruption managing section 31) outputs a processor element interruption signal to the selected processor element 2 for which the execution permission flag "1" is set in the operation permission table 32, thereby easily and securely controlling the operation/stop of each of the selected processor elements.

Moreover, upon receipt of a signal from the external, the PE control unit 3 (interruption managing section 31) selects one processor element 2, which is for processing this signal, from two or more (two in this embodiment) processor elements and actuates it, and further stops the operations of the processor elements other than this one processor element 2; therefore, it is possible to reduce the power consumption and to make the switching from the processing by the PE 2a to the processing by the PE 2b in apparently one program, which contributes to easy maintenance.

Still moreover, since the processor elements 2 have functions different from each other, it is possible to make each processor element conduct suitable processing, which contributes to the enhancement of the processing efficiency.

In particular, in a case in which an MPU and a DSP are provided as the two or more processor elements 2, it is possible that the MPU conducts the processing on the OS while the DSP conducts the real-time processing such as the processing of voice, image or moving image or input/output processing.

(B) Description of Second Embodiment

Figure 8:
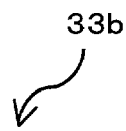
FIG. 8 is an illustration of an example of an interruption control table in a multiprocessor system according to a second embodiment of the present invention.

FIG. 8 is an illustration of an example of an interruption management table 33b in a multiprocessor system according to a second embodiment of the present invention. The multiprocessor system according to this second embodiment has the interruption management table 33b, shown in FIG. 8, in place of the interruption management table 33a, shown in FIG. 4, in the multiprocessor system 1a according to the first embodiment, and substantially has the same configuration as that of the above-described multiprocessor system 1a according to the first embodiment, except this interruption management table 33b.

The multiprocessor system according to the second embodiment is equipped with an existing single processor OS, and the PE 2*a* executes various control under the management of this OS while the PE 2*b* conducts the DSP processing as needed.

That is, in the multiprocessor system according to the second embodiment, the PE control unit 3 preferentially actuates one (PE 2*a*) of two or more processor elements 2, and actuates the PE 2*b* in place of the PE 2*a* as needed.

Also in the multiprocessor system according to the second embodiment, as in the case of the first embodiment, the PE control unit 3 sees the operation permission table 32 (see FIG. 3) and the interruption management table 33*b* to perform the control when an interruption occurs.

In addition, in the second embodiment, as FIG. 8 shows, all the interruption processing are assigned to the PE 2*a* which is made to conduct the OS processing, and an interruption handler of the PE 2*a* controls all the interruption processing. This enables the OS side to manage all the interruption processing.

In the multiprocessor system thus constructed according to the second embodiment of the present invention, the ordinary processing, but the interruption, is conducted through program processing by the PE 2*a*. In addition, if this program processing requires DSP processing, as well as the multiprocessor system 1*a* according to the first embodiment, the processing is conducted according to the sequence illustration of FIG. 5. That is, through the use of a function call in the main program P1, the switching to the DSP processing (function described with a DSP instruction) is made according to the library L1 and, after the completion of this DSP processing, the return to the main program P1 is made according to the library L1.

This signifies that, also in the multiprocessor system according to the second embodiment, the switching from the processing by the PE 2*a* to the processing by the PE 2*b* is made in the program which is apparently one in number, and at this time, the PE 2*a* is in the stopping condition while the PE 2*b* conducts the processing and, similarly, the PE 2*b* is in the stopping condition during the processing by the PE 2*a*.

Figure 9:
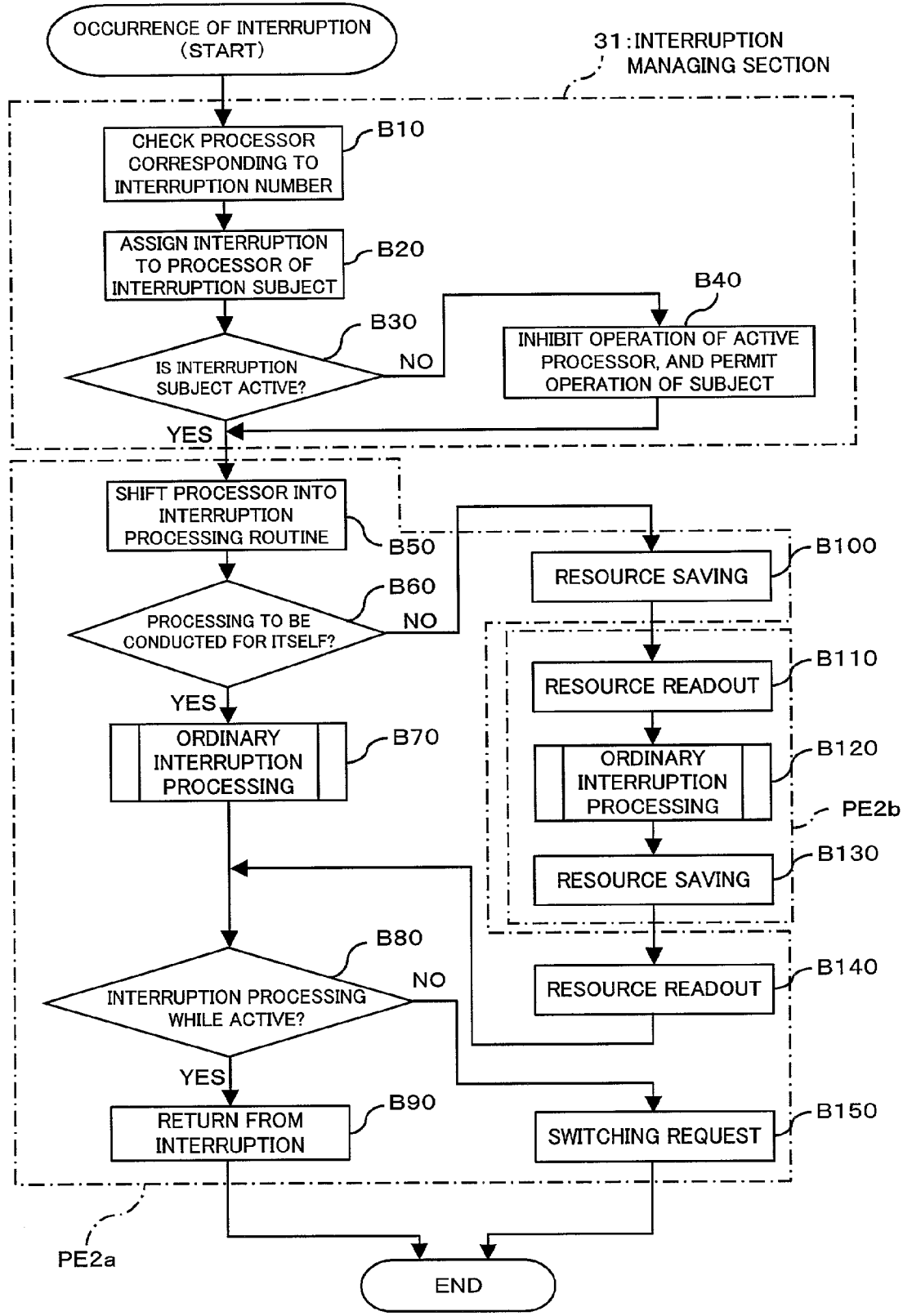
FIG. 9 is a flow chart useful for explaining a control method to be executed for when an interruption occurs, in the multiprocessor system according to the second embodiment of the present invention.

Secondly, referring to a flow chart (steps B10 to B150) of FIG. 9, a description will be given hereinbelow of a control method to be conducted for when an interruption occurs in the multiprocessor system according to this second embodiment.

For example, when an interruption occurs during the processing by a processor element 2 forming one of the PE 2*a* and the PE 2*b*, the interruption managing section 31 sees the interruption management table 33 to specify the processor element 2 corresponding to the interruption number of that interruption signal (step B10). Moreover, the interruption managing section 31 inputs a processor element interruption signal to that processor element 2 (step B20). Incidentally, all the interruption signals are inputted to the PE 2*a* as shown in FIG. 8.

Following this, the interruption managing section 31 sees the operation permission table 32 to make a decision as to whether or not the processor element 2 for the interruption processing is active (step B30). If this process or element 2 is active (see YES route from step B30), this processor element 2 (PE 2*a* in the second embodiment) proceeds to an interruption processing routine (step B50).

On the other hand, if the processor element 2 (PE 2*a*) undergoing the interruption is in the stopping condition (see NO route from step B30), the PE execution permitting section 34 deactivates the processor element 2 (PE 2*b*) which is in the active condition, and gives an operation permission to the PE 2*a* (step B40), and further outputs a processor element interruption signal to the PE 2*a* to actuate the PE 2*a*, and thereafter, the processing advances to the step B50.

The processing of these steps B10 to B40 are conducted by the interruption managing section 31.

The PE 2*a*, which has received the processor element interruption signal, uses its interruption handler to make a decision as to the processor element 2 which is to conduct the processing on that interruption request for checking whether or not to conduct the processing for itself (step B60). If the decision shows that it is to conduct the processing for itself (see YES route from step B40), the PE 2*a* conducts the ordinary interruption processing (step B70).

This ordinary interruption processing is realized by implementing, according to its priority, the requested interruption processing after the information (a program counter, a stack pointer, an argument of a function, an operation result, or the like) necessary for the processing being conducted is temporarily stored in a storing section (not shown). Moreover, task switching processing is sometimes conducted as this interruption processing.

In addition, after this ordinary interruption processing, the PE 2*a* makes a decision on whether or not it has been active when an interruption input has been made in the step B20 (step B80). If active, (see YES route from step B80), it again acquires the information stored in the storing section in the step B70 and returns to the state before the interruption processing (step B90) so that the processing comes to an end.

On the other hand, when the PE 2*a* has been in the stopping condition when the interruption input has been made in the step B20 (see NO route from step B80), the PE 2*a* issues, to the PE execution permitting section 34, a request on the switching to the PE 2*b* (step B150), and then the processing comes to an end.

Meanwhile, if the PE 2*a* makes a decision, through the use of its interruption handler, that the requested processing is not to be conducted for itself (see NO route from step B60), the PE 2*a* puts the handover information in the shared memory section 4 for resource saving (step B100). Moreover, at this time, the PE 2*a* outputs a switching request signal to the PE execution permitting section 34.

The PE execution permitting section 34 sets the execution permission flag in the operation permission table 32 on the basis of the switching request signal inputted from the PE 2*a* and stops the operation of the PE 2*a*, and further permits the operation of the processor element 2 (PE 2*b* in this embodiment) which is to conduct the requested processing.

The PE 2*b* acquires (resource return processing) the handover information from the shared memory section 4 (step B110) and then conducts the ordinary interruption processing (step B120). Incidentally, this ordinary interruption processing is similar to the processing to be conducted by the PE 2*a* in the step B70. Moreover, this procedure depends on the implementation method such as a task managing manner on the OS.

On the completion of the interruption processing, the PE 2*b* outputs a switching request signal to the PE execution permitting section 34, and the PE execution permitting section 34 sets the execution permission flag in the operation permission table 32 on the basis of the switching request signal inputted from the PE 2*b* and stops the operation of the PE 2*b*, and further permits the operation of the PE 2*a*. Moreover, the PE 2*b* puts the handover information in the shared memory section 4 for saving (step B130).

The active PE 2a acquires the handover information from the shared memory section 4 (step B140) and then enters in the step B80.

As described above, with the multiprocessor system according to the second embodiment of the present invention, not only the effects similar to those of the above-described first embodiment are obtainable, but also the PE control unit 3 preferentially actuates one of two or more processor elements 2 and actuates another processor element in place of the one processor element 2 as needed, which enables the preferentially actuated processor element 2 to seize the switching to the another processor element. That is, the interruption handler of the PE 2a can manage all the interruption processing, which facilitates the maintenance such as debug or the programming to provide further convenience.

(C) Description of Third Embodiment

Figure 10:
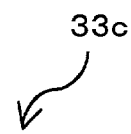
FIG. 10 is an illustration of an example of an interruption control table in a multiprocessor system according to a third embodiment of the present invention.

FIG. 10 is an illustration of an example of an interruption management table in a multiprocessor system according to a third embodiment of the present invention. The multiprocessor system according to the third embodiment is equipped with an interruption management table 33c in place of the interruption management table 33a, shown in FIG. 4, in the multiprocessor system 1a according to the first embodiment, and the configuration other than this interruption management table 33c is almost same as that of the above-mentioned multiprocessor system 1a according to the first embodiment.

In general, in information processing terminals, an OS manages each task and makes the switching between tasks, or the like, in accordance with interruption, but in this case, such task switching requires a large overhead.

On the other hand, in the DSP processing, the processing executable with several steps in a program exists, such as the processing in which a flag or status is simply rewritten in accordance with interruption.

If all of these simple and low-load processing (which sometimes will be referred to hereinafter as "micro-processing") are assigned to the MPU side as interruption so that the MPU makes a decision on the processing contents each time and the processing is conducted by the switching to the DSP, the performance of the system drops.

For this reason, in the multiprocessor system according to the third embodiment, for the processing which does not require the intervention of the OS or the processing in which the intervention of the OS causes a significant drop of the performance (particularly, the processing whose processing unit is small and whose interruption frequency is high), they are directly assigned to the DSP as interruption without the intervention of the MPU to be conducted by an interruption handler of the DSP.

This DSP handler is only required to have a function to conduct the necessary DSP processing and then to return. Moreover, it is preferable to inhibit the multiple interruption for preventing further interruption from occurring with respect to the DSP while the DSP conducts the micro-processing. This enables sure and quick return to the previous processing interrupted.

The multiprocessor system according to the third embodiment is provided with an OS for an existing single processor, and mainly actuates an interruption handler on the PE 2a side so that the PE 2a performs various control under control of this OS, and further makes the PE 2b conducts the micro-processing, which is not required to go through a procedure such as task management by the OS, as interruption.

That is, in the multiprocessor system according to the third embodiment, as FIG. 10 shows, a processor element interruption signal from the interruption managing section 31 is inputted to both the PE 2a and PE 2b.

In addition, in the interruption management table 33c, the processor element 2 corresponding to each interruption purpose (specified by an interruption number) is registered in advance as shown in FIG. 10.

Still additionally, the PE control unit 3 (interruption managing section 31) sees this interruption management table 33c and the operation permission table 32 to control the interruption processing to each processor element 2.

The ordinary processing, but the interruption, in the multiprocessor system thus made according to the third embodiment of the present invention is similar to that of the multiprocessor system according to the second embodiment described above with reference to FIGS. 5 and 6, and the description thereof will be omitted for brevity.

Moreover, in the multiprocessor system according to the third embodiment, a control method to be conducted for when there arises interruption processing to be conducted by the PE 2a (MPU) is similar to that in the multiprocessor system according to the second embodiment described above with reference to FIG. 9, and the description thereof will be omitted for brevity.

Figure 11:
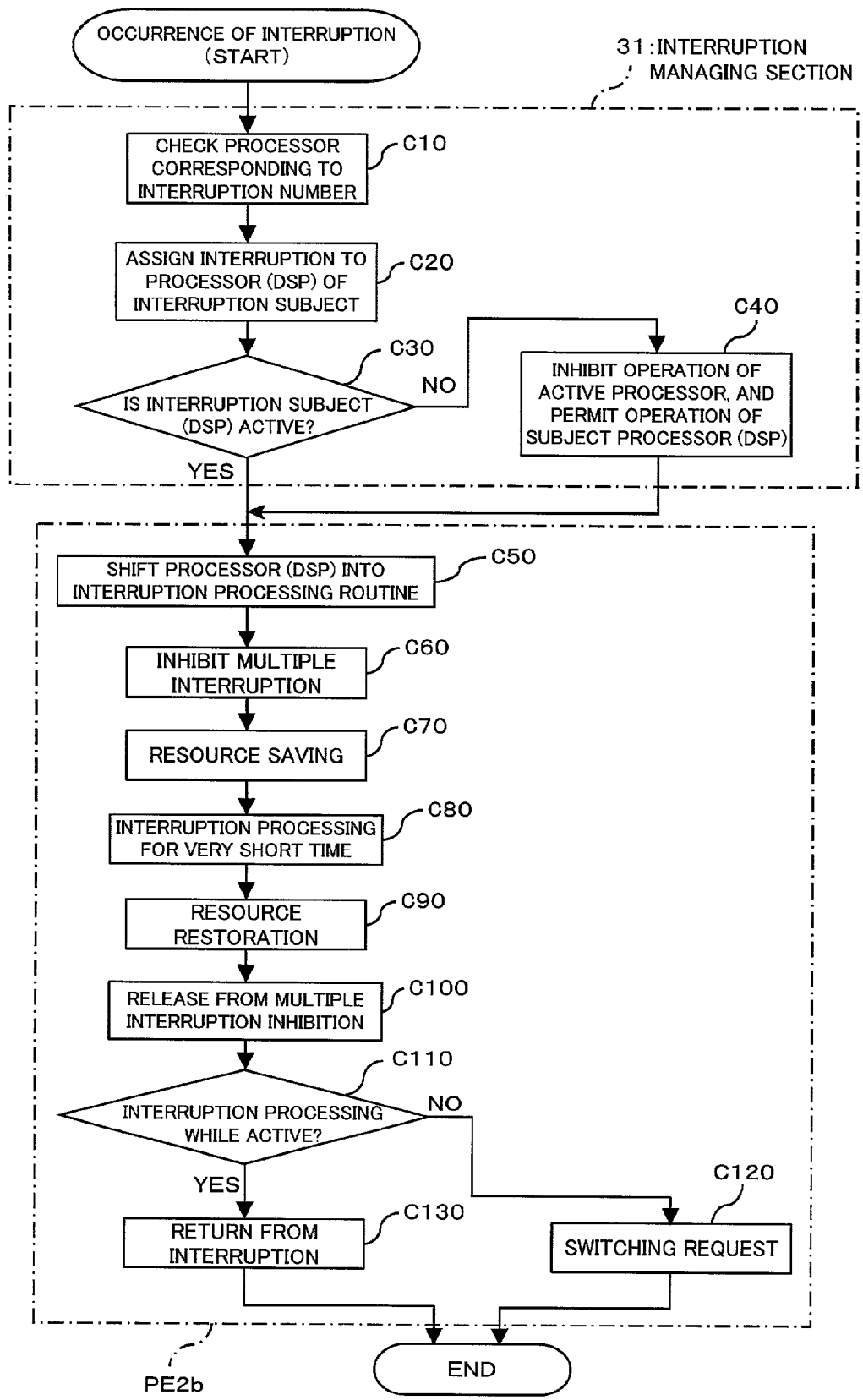
FIG. 11 is a flow chart useful for explaining a control method to be executed for when interruption processing (micro-processing) to be conducted by a DSP in the multiprocessor system according to the third embodiment of the present invention takes place.

Referring to a flow chart (steps C10 to C130) of FIG. 11, a description will be given hereinbelow of a control method to be taken for when there exists interruption processing (micro-processing) to be conducted by the PE 2b (DSP) in the multiprocessor system according to the third embodiment.

For example, when an interruption occurs during the processing by the processor element 2 forming one of the PE 2a and the PE 2b, the interruption managing section 31 sees the interruption management table 33c to specify the processor element 2 corresponding to the interruption number of that interruption signal (step C10). Moreover, the interruption managing section 31 inputs a processor element interruption signal to this processor element 2 (PE 2b (DSP) in this description) (step C20).

Following this, the interruption managing section 31 sees the operation permission table 32 to make a decision as to whether or not the PE 2b which is to conduct the interruption processing is active (step C30). If the PE 2b is active (see YES route from step C30), the PE 2b enters in an interruption processing routine (step C50).

On the other hand, if the PE 2b is in the deactivated state (see NO route from step C30), the PE execution permitting section 34 deactivates the active PE 2a and gives the operation permission to the PE 2b (step C40), and further outputs a processor element interruption signal to the PE 2b to activate the PE 2b, and the operational flow then proceeds to the step C50.

The processing in these steps C10 to C40 are conducted by the interruption managing section 31.

After the inhibition of multiple interruption (step C60), the PE 2b temporarily puts information (a program counter, a stack pointer, an argument of a function, an operation result and others; these information are equally referred to generally as "resources") necessary for the processing being conducted, in a storing section (not shown) according to the priority of that interruption processing for resource saving (step C70).

In addition, the PE 2b conducts the micro-processing (step C80) and then reads out the resources which have been put in the storing section for the saving (step C90). Still additionally, after conducting this ordinary interruption processing, the PE 2b makes a decision as to whether or not it has been active when the interruption input has been made in the step C20 (step C110). If active (see YES route from step C110), the PE 2b again acquires the information temporarily stored in the storing section in the step C70 and returns to the state before the interruption processing (step C130), and thereafter the processing comes to an end.

On the other hand, if the PE 2b has been in the stopping state at the interruption input in the step C20 (see NO route from step C110), the PE 2b makes a request for the switching to the PE 2a to the PE execution permitting section 34 (step C120), and thereafter, the processing comes to an end.

As described above, with the multiprocessor system according to the third embodiment of the present invention, the effects similar to those of the above-described second embodiment are obtainable, and since the micro-processing is assigned directly to the DSP (PE 2b) so that the processing is conducted by an interruption handler of this DSP, there is no need for the interruption handler of the MPU (PE 2a) to make a decision on the processing contents and to conduct the switching processing, which increases the processing speed because of the reduction of the overhead due to these processing.

Moreover, by inhibiting the multiple interruption for preventing further interruption from occurring with respect to the DSP while the PE 2b conducts the micro-processing, sure and quick return to the previous processing interrupted becomes feasible.

(D) Description of Fourth Embodiment

Figure 12:
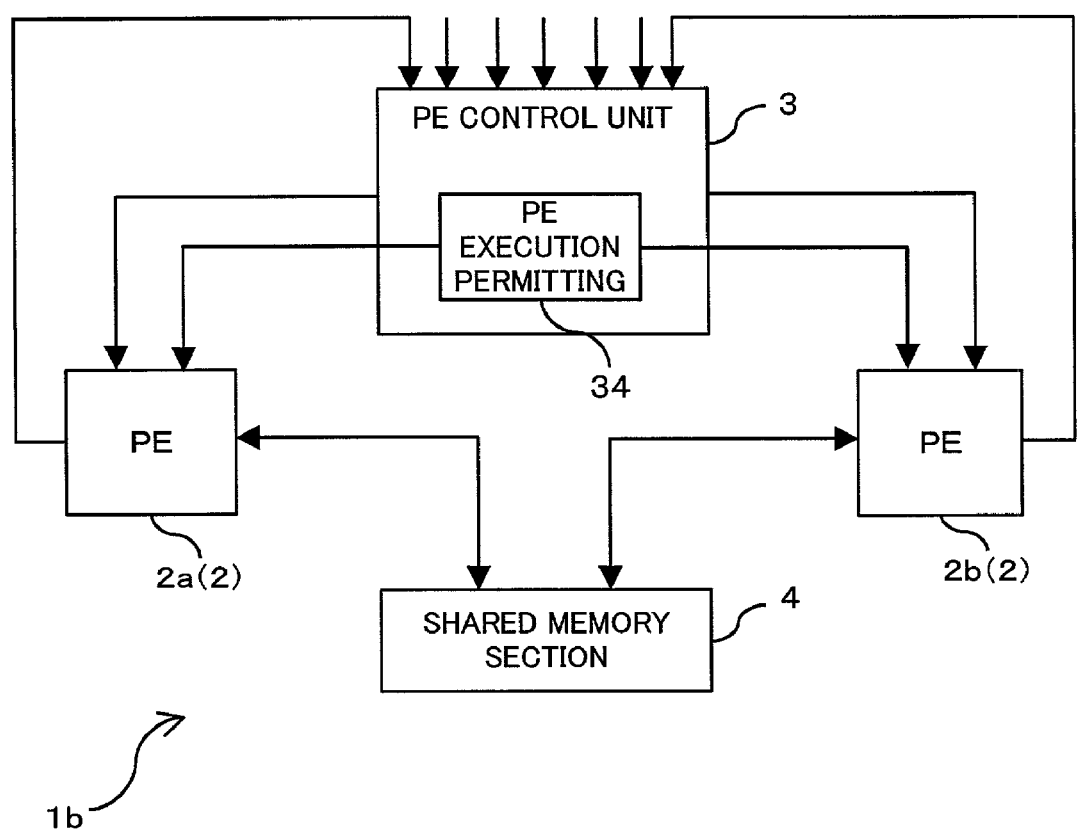
FIG. 12 is a block diagram showing a functional configuration of a multiprocessor system according to a fourth embodiment of the present invention.
Figure 13:
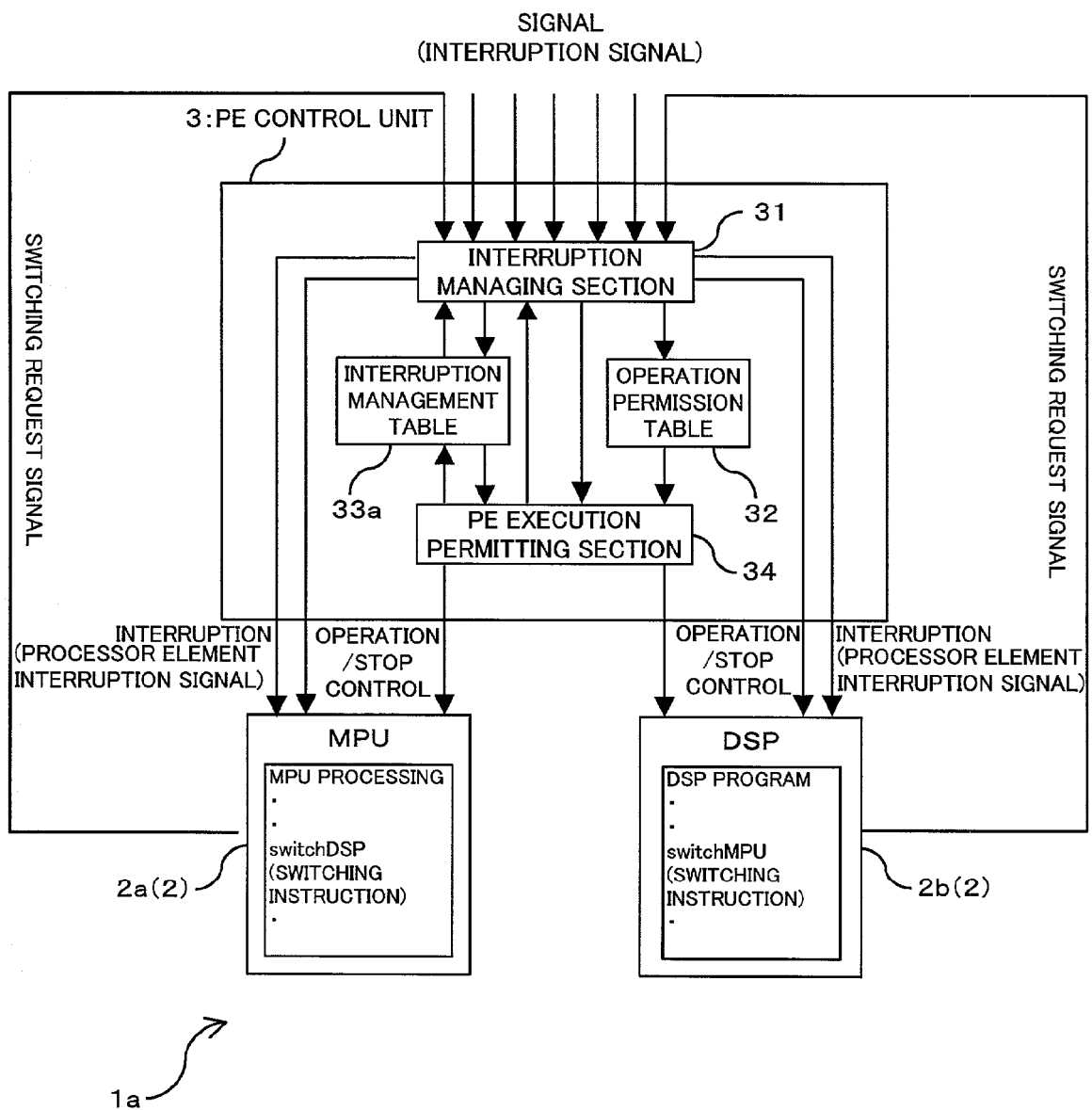
FIG. 13 is a block diagram useful for explaining a functional configuration and signal flow in the multiprocessor system according to the fourth embodiment of the present invention.

FIGS. 12 and 13 are illustrations for explaining a configuration of a multiprocessor system 1b according to a fourth embodiment of the present invention. FIG. 12 is a block diagram showing a functional configuration thereof, and FIG. 13 is a block diagram showing a functional configuration and signal flow of the multiprocessor system 1b according to the fourth embodiment.

In the multiprocessor system 1b according to the fourth embodiment, as FIGS. 12 and 13 show, instead of the switching request signal inputted from each processor element 2 to the PE execution permitting section 34, a switching request signal is inputted as a switching control interruption signal from each processor element 2 to an interruption managing section 31 of a PE control unit 3.

In the illustrations, the same numerals as those used above signify the same or generally same parts, and the description thereof will be omitted for simplicity.

In general, the interruption based on software (which will be referred to hereinafter as "software interruption") is conducted as closed processing in the interior of a processor element. For example, a program branch to interruption processing is made by being triggered by a software interruption instruction, and after the completion of this interruption processing, the return to the processing interrupted takes place by an interruption return instruction.

In the multiprocessor system 1b according to the fourth embodiment, when a processor element switching request is made to the PE control unit 3, each processor element 2 is made to output a switching control interruption signal to the PE control unit 3.

In the PE control unit 3, when the switching control interruption signal is inputted thereto from each processor element 2, the interruption managing section 31 controls the processor element 2 on the basis of the switching control interruption signal. Concretely, the PE control unit 3 uses the PE execution permitting section 34 to place the processor element 2, which has outputted that switching control interruption signal, into an operation inhibited condition, and further place the processor element 2 after switched into an operation permitted condition.

In the multiprocessor system 1b according to the fourth embodiment of the present invention, a processor element switching request, which is made by transmitting a switching request signal from each processor element 2 to the PE execution permitting section 34 of the PE control unit 3 in the above-described first to third embodiments, can be handled as one of interruption imposed on the PE control unit 3.

Thus, in the PE control unit 3, the switching processing of the processor elements 2 can be managed unitarily together with other processing. Moreover, in the interior of the processor element 2, the software interruption instruction closed internally in the usual way can work, so to speak, as an internal instruction to another processor.

(E) Description of Fifth Embodiment

A multiprocessor system according to a fifth embodiment of the present invention further includes, in addition to the configurations of the above-described multiprocessor systems according to the first to fourth embodiments, an invalidating section (not shown) capable of invalidating the switching function of the PE control unit 3 for actuating the respective processor elements simultaneously.

A CPU (Central Processing Unit) of an information processing apparatus executes a program (multiprocessor control program) stored in a computer-readable recording medium (for example, memory, magnetic storage, floppy disc, memory card, magneto optical storage, CD-ROM, CD-R, CD-RW, DVD, DVD-R, DVD-RW, or the like), thereby functioning as the invalidating section.

The method of realizing the function as the invalidating section is not limited to the aforesaid execution of the program by the CPU, but it is also possible to use a hardware functioning as the invalidating section.

This invalidating section is made to realize its function by invalidating the function of the PE execution permitting section 34 of the PE control unit 3, and for example, a user can arbitrarily set the invalidation of the switching function of the PE control unit 3.

Upon the invalidation of the function of the PE execution permitting section 34, the respective processor elements 2 are independently placed into an operation-permitted condition to allow the simultaneous operation without undergoing the execution stop control by the PE execution permitting section 34 (invalid mode).

As described above, in the multiprocessor element according to the fifth embodiment of the present invention, through the setting to an invalidation mode by the invalidating section, all the processor elements 2 can be put simultaneously in operation, and for example, in the case of the processing requiring a high processing performance, the fast processing becomes feasible, and flexible use of the multiprocessor system according to the present invention becomes possible.

(F) Others

The present invention is not limited to the above-described embodiments, but the invention covers all changes and modifications of the embodiments of the invention herein used for the purpose of the disclosure, which do not constitute departures from the spirit and scope of the invention.

For example, although in the description of the embodiments the processor elements 2 are two in number, the present invention is not limited to this, but it is also possible to use three or more processor elements.

In addition, although in the description of the embodiments an MPU and DSP are used as the two or more processor elements, the present invention is not limited to this, but it is also possible to use processor elements other than these MPU and DSP.

Still additionally, although in the description of the embodiments the processor elements (MPU and DSP) different in type from each other are used as the two or more processor elements, the present invention is not limited to this, but processor elements, such as two or more MPUs, identical in type to each other are also acceptable.

Moreover, although in the above-described embodiments the shared memory section 4 and the storing section are constructed with a RAM (Random Access Memory) or the like, the present invention is not limited to this, but it is also appropriate to instead use another recording medium, such as magnetic storage, memory card or the like.

The disclosure of each of the embodiments of the present invention allows those skilled in the art to realize the multiprocessor system, multiprocessor control method and multiprocessor control program retaining computer-readable recording medium according to the present invention.

What is claimed is:

1. A multiprocessor system comprising:
two or more processor elements whose performances are to be executed by a common program;
a switching request signal detecting section for detecting a switching request signal to request switching such plural processor elements one from another;
a control section for switching said one processor element to said another processor element for execution by said common program;
a storing section, responsive to each switching of said processor elements by said control section, for storing handover information relating to the common program which information is to be handed over from said one processor element to said another processor element;
a store control section for storing said handover information from said one processor element into said storing section when said switching request signal detecting section detects the switching request signal;
a stop control section for stopping the performance of said one processor element after said store control section stores said handover information into said storing section; and
a start control section for starting the performance of said another processor element using said handover information stores in said storing section;
wherein said control section has a management information for indicating, for designation of one at a time from said plural processor elements, a permitted-to-perform processor element, which is allowed to perform processing, and controls the switching of said processor elements so as to designate said permitted-to-perform processor element based on said management information.

2. A multiprocessor system according to claim 1, wherein, if a performance requested to be executed for one of said plural processor elements is to be made by said another processor element, said another processor element outputs said switching request signal to said control section.

3. A multiprocessor system according to claim 2, wherein said switching request signal is a switching control interruption signal.

4. A multiprocessor system according to claim 1, wherein, upon receipt of a signal from outside said system, said control section outputs an interruption signal to the another processor element to stop the performance thereof.

5. A multiprocessor system according to claim 2, wherein, upon receipt of a signal from outside said system, said control section outputs an interruption signal to said another processor element to stop the performance thereof.

6. A multiprocessor system according to claim 3, wherein, upon receipt of a signal from outside said system, said control section outputs an interruption signal to said last-named processor element to stop the performance thereof.

7. A multiprocessor system according to claim 1, wherein said management information is a table.

8. A multiprocessor system according to claim 2, wherein said management information is a table.

9. A multiprocessor system according to claim 3, wherein said management information is a table.

10. A multiprocessor system according to claim 4, wherein said management information is a table.

11. A multiprocessor system according to claim 5, wherein said management information is a table.

12. A multiprocessor system according to claim 6, wherein said management information is a table.

13. A multiprocessor system according to claim 7, wherein, with consulting said table, said control section selects said permitted-to-perform processor element, which is indicated by said table, as said another processor element, and outputs an interruption signal to said permitted-to-perform processor element to stop the performance thereof.

14. A multiprocessor system according to claim 8, wherein, with consulting said table, said control section selects said permitted-to-perform processor element, which is indicated by said table, as said another processor element, and outputs an interruption signal to said permitted-to-perform processor element to stop the performance thereof.

15. A multiprocessor system according to claim 9, wherein, with consulting said table, said control section selects said permitted-to-perform processor element, which is indicated by said table, as said another processor element, and outputs an interruption signal to said permitted-to-perform processor element to stop the performance thereof.

16. A multiprocessor system according to claim 10, wherein, with consulting said table, said control section selects said permitted-to-perform processor element, which is indicated by said table, as said another processor element, and outputs an interruption signal to said permitted-to-perform processor element to stop the performance thereof.

17. A multiprocessor system according to claim 11, wherein, with consulting said table, said control section selects said permitted-to-perform processor element, which is indicated by said table, as said another processor element, and outputs an interruption signal to said permitted-to-perform processor element to stop the performance thereof.

18. A multiprocessor system according to claim 12, wherein, with consulting said table, said control section selects said permitted-to-perform processor element, which is indicated by said table, as said another processor element, and outputs an interruption signal to said permitted-to-perform processor element to stop the performance thereof.

19. A multiprocessor system according to claim 1, wherein said control section actuates one of said plural processor elements with precedence over the remaining processor elements, and actuates one of said remaining processor elements in place of the second-to-last-named one processor element as demand arises.

20. A multiprocessor system according to claim 1, wherein said plural processor elements are different in function from one another.

21. A multiprocessor system according to claim 20, wherein, upon receipt of a signal from outside said system, said control section selects, from said plural processor elements, one processor element to handle the last-named signal, and actuates the selected one processor element.

22. A multiprocessor system according to claim 20, wherein at least one of said plural processor element is an MPU (Micro Processing Unit) and the remainder is a DSP (Digital Signal Processor), or vice versa.

23. A multiprocessor system according to claim 21, wherein at least one of said plural processor element is an MPU (Micro Processing Unit) and the remainder is a DSP (Digital Signal Processor), and vice versa.

24. A multiprocessor system according to claim 1, further comprising an invalidating section for invalidating the switching function of said control section to thereby actuate at least two or more of said plural processor elements simultaneously.

25. A multiprocessor system according to claim 1, wherein said handover information to be stored in said storing section includes at least one selected from the group consisting of a value of a program counter, an argument of a function, a return value of a function, and content of a stack pointer.

26. A multiprocessor control method for switching two or more processor elements of a multiprocessor system, whose performances are to be executed by a common program, said control method comprising the steps of:
  (a) detecting a switching request signal to request switching such plural processor elements, one from another;
  (b) controlling the switching of said processor elements so as to designate a permitted-to-perform processor element; which is allowed to perform processing, based on said management information for indicating, for designation of one at a time from said plural processor elements, said permitted-to-perform processor element;
  (c) in response to each switching of said processor elements, storing handover information relating to the common program, which information is to be handed over from said one processor element to said another processor element, into a storing section of said multiprocessor system;
  (d) after said handover information has been stored into the storing section, stopping the performance of said one processor element; and
  (e) starting the performance of said another processor element using said handover information stored in the storing section.

27. A computer-readable recording medium in which a multiprocessor control program for switching two or more processor elements of a multiprocessor system, whose performances are to be executed by a common program, wherein said multiprocessor control program instructs a computer at the system to execute the steps of:
  (a) detecting a switching request signal to request switching such plural processor elements one from another;
  (b) controlling the switching of said processor elements so as to designate a permitted-to-perform processor element; which is allowed to perform processing, based on said management information for indicating, for designation of one at a time from said plural processor elements, said permitted-to-perform processor element;
  (c) in response to each switching of said processor elements, storing handover information relating to the common program, which information is to be handed over from said one processor element to said another processor element, into a storing section of said multiprocessor system;
  (d) after said handover information has been stored into the storing section, stopping the performance of said one processor element; and
  (e) stopping the performance of said another processor element using said handover information stored in said storing section.

* * * * *

UNITED STATES PATENT AND TRADEMARK OFFICE
CERTIFICATE OF CORRECTION

PATENT NO. : 7,269,831 B2  Page 1 of 1
APPLICATION NO. : 09/987887
DATED : September 11, 2007
INVENTOR(S) : Ryuta Tanaka et al.

It is certified that error appears in the above-identified patent and that said Letters Patent is hereby corrected as shown below:

Title page, col. 2, line 11, Abstract delete "process or" and insert --processor--, therefor Signed and Sealed this Fourth Day of March, 2008

JON W. DUDAS
*Director of the United States Patent and Trademark Office*